United States Patent Office 2,925,215
Patented Feb. 16, 1960

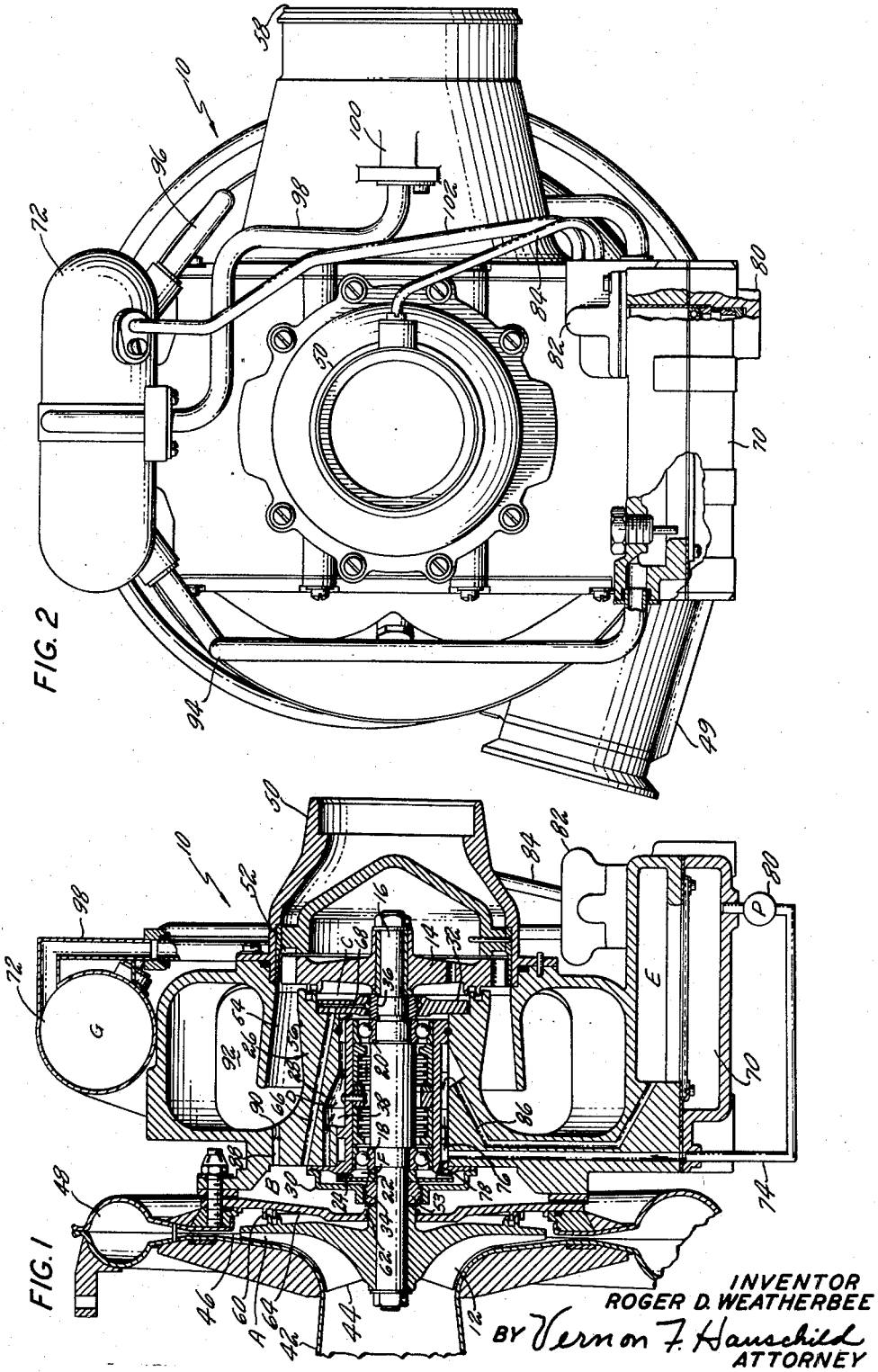

2,925,215

LUBRICATION SYSTEM

Roger D. Weatherbee, Windsor Locks, Conn., assignor to United Aircraft Corporation, East Hartford, Conn., a corporation of Delaware Application June 20, 1957, Serial No. 666,848

6 Claims. (Cl. 230—116)

This invention relates to a compressor-turbine unit adapted to compress and cool air and more particularly to the bearing lubrication and cooling system to be used therewith.

It is an object of this invention to teach a lubrication system for use with a high speed turbine and compressor unit which utilizes an impeller to provide a lubricant mist and to circulate that mist through a circuital path to lubricate and cool the unit bearings.

It is a further object of this invention to teach a lubrication system for use with a compressor-turbine unit in which compressor provided air is utilized to seal the lubricant mist within its intended chamber.

It is a further object of this invention to teach a lubricating and cooling system for a high speed compressor-turbine unit in which lubricant is raised from a sump and directed to an impeller inlet as a function of compressor generated pressure.

It is a further object of this invention to provide a lubricating and cooling system for a compressor-turbine unit by bleeding compressor air, forming a lubricant mist cation and cooling is eventually directed to a separator where the lubricant and air are separated and both discharged for further use.

It is a further object of this invention to provide a lubricating and cooling system for a compressor-turbine unit by bleeding compressor air, formnig a lubricant mist by mixing the bleed air with lubricant and circulating the mist over the unit bearings.

It is still a further object of this invention to provide a lubrication system for a high speed compressor-turbine unit which is completely enclosed and pressurized so that the compressed air, the compressed air-lubricant mist and the lubricant are retained within the system for further utilization after they have accomplished their lubricating and cooling functions in the compressor-turbine unit.

It is still a further object of this invention to provide a high speed compressor-turbine unit in which compressed air is introduced to and further compressed by the compressor and then passed through the turbine for cooling such that the compressor provides a load for the turbine, which unit has a pressure regulated lubricant mist lubrication and cooling system.

Other objects and advantages will be apparent from the specification and claims, and from the accompanying drawing which illustrates an embodiment of the invention.

In the drawing:

Fig. 1 is a cross sectional view of the compressor-turbine unit taught herein; and Fig. 2 is an external view of the compressor-turbine unit taught herein showing the external lubricant-mist, lubricant and air carrying lines and with portions broken away to illustrate interior configurations.

While it will be obvious to those skilled in the art that the turbine-compressor unit and the lubrication and cooling system taught herein have enumerable applications, for purposes of description and to show a complete embodiment, both the drawings and description will be given with respect to an auxiliary compressor-turbine unit to provide cool, compressed air to a modern aircraft to perform such functions as passenger cabin cooling and pressurization.

Referring to Fig. 1 it will be noted that compressor-turbine unit 10 comprises compressor 12 and turbine 14. Compressor 12 and turbine 14 are mounted back-to-back for rotation on shaft 16. Shaft 16 is rotatably supported by at least one bearing such as 18 and 20 and carries impeller 22 for rotation therewith. Impeller 22 is provided with circumferentially spaced impelling blades or fins 24. Housing 26 supports bearings 18 and 20 and contains lubricating cavity or chamber 28 which envelops bearings 18 and 20 and impeller 22. Plates 30 and 32, which may be a part of housing 26, join housing 26 in sealing relation with shaft 16 to form cavity 28. Seals 34 and 36, which may be of the labyrinth type are mounted for rotation on shaft 16 and are located in sealing relation with plates 30 and 32. It will be noted that cavity 28 is formed to provide a circuital path such that a lubricant mist, such as an oil mist, to be referred to hereinafter, may be pumped by impeller 22 through chamber 38, through bearing 20 then through bearing 18 for return to impeller 22 for continual circulation through this path.

Compressed air, possibly from the aircraft engine compressor will be introduced to auxiliary compressor-turbine unit 10 through duct 42 to compressor inlet 44 where it will be further compressed by auxiliary compressor 12 and then discharged to compressor discharge 46 from whence it will be accumulated in manifold 48 and then ducted through line 49 to duct 50 for admission to inlet 52 of turbine 14. The air may be cooled both before and after leaving compressor 12 and an insert 53 may be placed on shaft 16 to prevent the flow of heat from compressor 12 to housing 26 through shaft 16. Insert 53 may be made of Alundum. The compressed air is cooled considerably in passing through turbine 14 and the cooled turbine discharge compressed air is passed through passage 54 where it performs a heat exchange and scrubbing action on surface 56 of housing 26 to extract heat therefrom and, therefore, cool the lubricant mist being passed through cavity 28. After leaving duct 54, the turbine discharge compressed air is then passed through duct 58 for admission to the aircraft cabin as cool compressed air for pressurization and air conditioning purposes. It is an important feature of this invention that the air passing through duct 58 be free of lubricant for passenger comfort when this air is used for passenger cabin pressurization and to prevent detrimental lubricant deposit on moving parts when this air is used for other purposes.

Since the lubrication and cooling system, now to be described, is pressure actuated, reference letters have been placed in Fig. 1 to designate pressure areas in the order of decreasing pressure. The highest pressure area in the system exists at area A and the pressure in area B is somewhat less since in passing from area A to area B, the compressor discharge air A must be bled through compressor seal 60 and through seal 62, which may be of the labyrinth type, and which is located on plate 64 which separates compressor discharge area A from compressor scavenge air area B. It will be noted that, as described hereinafter, compressor scavenge air from pressure area B will eventually be utilized and recovered. The next lowest pressurized area is area C, which is fed compressor scavenge air through line 66 and then through line 68 from whence it is passed between labyrinth seal 36 and plate 32 into the chamber of pressure area C. The next pressurized chamber is designated as D, which is also cavity 28. As will be shown later, cavity 28 is in communication with the turbine discharged area due to the connections between area D, tank type sump 70, and air-lubricant mist collector and separator can 72. The next pressurized area is area E, in sump 70, which will be somewhat less than the pressure in area D due to line losses. The next pressurized area is area F, which is the inlet side of impeller 22 and which will obviously be less than the discharge side of impeller 22, or area D. The last pressurized area is area G, which will be shown later to be in communication with and, therefore, substantially the discharge pressure from turbine 14.

With respect to the lubrication system, lubricant, which may be oil, is conducted from sump 70, which is located at the bottom of housing 26 for gravity drain purposes, through line 74, into annular chamber 76 and then through restricted orifice or jet 78 which opens into the inlet of impellers 22. While pump 80 may be used to pump lubricant through line 74 to lubricant jet 78, such may not be found to be necessary due to the fact that the pressure at jet 78 is the inlet pressure to impeller 22 while the pressure acting on the lubricant in sump 70 is substantially impeller discharge pressure, so that the pressure differential across impeller 22 will cause the lubricant to rise through line 74 and to be directed against impeller 22 through jet 78 at all high speed conditions. Because compressor turbine unit 10 may be required to operate over a wide range of conditions, the pump may be necessary to assure an adequate flow of oil. Due to the complications of gearing to a high speed shaft, it may be considered preferable to drive pump 80 by an auxiliary turbine 82 which is fed air from the inlet of turbine 14 through line 84.

The lubricant jet which passes through restrictive passage 78 is directed to impinge against the whirling blades or fins 24 of impeller 22 and flung centrifugally as a lubricant mist and pumped by impeller action through chamber 38 of cavity 28, where it is cooled by the cooling effect of turbine discharge air scrubbing against surface 56 of housing 26 and thence through bearing 20, lubricating and cooling same, and thence through bearing 18, lubricating and cooling same, for return to impeller 22 for further circulation through this circuital path. The lubricant which separates out of the lubricant mist will be returned to sump 70 through line 86.

Compressor scavenge air from area B is passed between plate 30 of housing 26 and labyrinth seal 34 into cavity 28 simultaneously with such compressed or scavenge air which, as previously described, passes through lines 66 and 68 for entry into cavity 28 between plate 32 of housing 26 and labyrinth seal 36. Pressure build up in cavity 28 is prevented by the fact that chamber 28 is in communication with sump 70 and separator 72. This compressor scavenge air enters cavity 28 from both directions and serves the function of sealing the lubricating mist within chamber 28 by preventing it from seeping through seals 34 and 36. A vent line 88, preferably with relief valve 90 therein, connects compressor scavenge air chamber B with turbine discharge chamber 92, which will hereinafter be described to be in communication with sump 70 through collector can 72, such that it is substantially at pressure D, in chamber 28. Vent 88 and relief valve 90 determine the pressure difference between pressures B and D, which is substantially the pressure drop across impeller 22, and, therefore, governs the rate of flow of compressor scavenge air into cavity 28. This is an important function since the compressor discharge air need flow in sufficient quantity to seal the lubricant mist chamber 28; yet if the rate of scavenge air flow into cavity 28 becomes too large, the lubricant cooling effect will be lost due to the high temperature of the compressor scavenge air. Also, excessive flows of scavenging air will disrupt the desired circulatory flow of lubricant mist through the bearings. Excessive scavenging air flow will reduce effectiveness of the separator can 72.

The lubricant mist would be formed and circulated in cavity or chamber 28 without the assistance of scavenge air but the scavenge air is necessary for the sealing function described above. The flow of scavenge air in cavity 28 joins the mist in the lubricant mist flow path both in cavity 28 and in line 86 but is regulated to be sufficiently small such that this is not harmful heatwise. The scavenge air, after passing through cavity 28 and line 86 into sump cavity 70 will then be passed, due to a positive flow caused by pressure differentials E and G either through line 94 or 96 to collector or separator can 72. Two such lines, 94 and 96 are chosen and placed at diagonally opposite top corners of sump cavity 70 such that an oil mist line connection is available between sump cavity 70 and collector can 72 irrespective of aircraft attitude within certain limits. Collector or separator 72 is located at the top of housing 26 for gravity drain purposes and to give maximum attitude flexibility. For stationary installations, the double line system will not be necessary since these lines may be chosen to be of sufficient size that lubricant mist may be directed upward through a given line to the collector can 72 at the same time that the separated lubricant is flowing downward as film flow on the inside surface of the same line in return from collector can 72 to sump cavity 70. The liberated and lubricant free air from collector and separator 72 is passed through line 98 to connection 100 which enters turbine discharge duct 58.

As mentioned previously, operating air is provided to pump turbine 82 from the inlet of turbine 14 through line 84. Since this could well be air which has already passed through an aircraft engine compressor and, therefore, may be permeated with oil particles, provision is made to pass the discharge air from turbine pump 82 through line 102 to collector or separator 72. The oil permeated air from line 102 is separated into lubricant and air in collector 72 and the lubricant is discharged either through line 94 or 96 while the air is discharged through line 98.

It is to be understood that the invention is not limited to the specific embodiment herein illustrated and described, but may be used in other ways without departure from its spirit as defined by the following claims.

I claim:

1. In a turbine-compressor air compressing and cooling unit mounted on a shaft rotatably supported by at least one bearing, a bearing lubricating and cooling system comprising a housing having a cavity enveloping said bearing and engaging said shaft in sealing relation at two spaced seal areas on opposite sides of said bearing, an impeller located in said cavity and mounted for rotation with said shaft, means to direct a jet of lubricant against said impeller so that a lubricant mist is formed and circulated within said cavity for bearing lubricating and cooling purposes.

2. In a turbine-compressor air compressing and cooling unit mounted on a shaft rotatably supported by at least one bearing, a bearing lubricating and cooling system comprising a housing having a cavity enveloping said bearing and engaging said shaft in sealing relation at two spaced seal areas on opposite sides of said bearing, an impeller having an inlet and an outlet and located in said cavity and mounted for rotation with said shaft so that cavity pressure is substantially impeller discharge pressure, a lubricant sump connected with said cavity and having a lubricant outlet, nozzle means located adjacent said impeller inlet and connected to the lubricant outlet of said sump so that a jet of lubricant is directed against said impeller at the impeller inlet in response to the pressure differential across said impeller acting upon said sump due to said connections between said sump and said cavity and nozzle means so that a lubricant mist is formed and circulated within said cavity for bearing lubricating and cooling purposes.

3. An air compression and cooling system comprising a compressor having an inlet and a discharge side, a turbine having an inlet and a discharge side, a rotatable shaft joining and spacing said compressor and turbine, duct means joining said compressor discharge side with said turbine inlet side, spaced bearings supporting said shaft for rotation, means to support said bearings, an enclosed lubricating system for lubricating and cooling said bearings comprising an impeller mounted for rotation with said shaft, a lubricating cavity enveloping said bearings and impeller and defining a single circuital path through said bearings and impeller, spaced seals engaging said shaft and housing to seal said lubricating cavity, a lubricant sump communicating with said cavity, means to introduce a jet of lubricant against said impeller in response to the pressure difference across said impeller.

4. An enclosed air compressing and cooling unit mounted on a shaft rotatably supported by at least one bearing comprising a compressor and a turbine each having an inlet and a discharge side, means to duct air from said compressor to said turbine, a bearing lubricating and cooling system comprising a housing having a cavity enveloping said bearing and engaging said shaft in sealing relation at two spaced seal areas on opposite sides of said bearing, an impeller located in said cavity and mounted for rotation with said shaft, a lubricant sump, compressor discharge air driven means to direct a jet of lubricant from said sump against said impeller so that a lubricant mist is formed and circulated within said cavity for bearing lubricating and cooling purposes, means to separate the lubricant and air from said lubricant mist after said lubricant mist has circulated through said cavity, means to return said lubricant so separated to said sump, means to return said air so separated to said turbine outlet, and means to direct compressor air into said cavity through both of said seal areas to seal said lubricant in said cavity.

5. An air compression and cooling system comprising a compressor having an inlet and a discharge side, a turbine having an inlet and a discharge side, a rotatable shaft joining and spacing said compressor and turbine, duct means joining said compressor discharge side with said turbine inlet side, spaced bearings supporting said shaft for rotation, means to support said bearings, an enclosed lubricaitng system for lubricating and cooling said bearings comprising an impeller mounted for rotation with said shaft, a lubricating cavity enveloping said bearings and impeller and defining a single circuital path through said bearings and impeller, spaced seals engaging said shaft and housing to seal said lubricating cavity, a lubricant sump communicating with said cavity, means to introduce a jet of lubricant against said impeller in response to the pressure difference across said impeller, means to pass compressor discharge air through each of said seals and into said lubricating cavity to retain said lubricant in said cavity and to form a mist with said lubricant due to impeller action to pass through said path to lubricate and cool said bearing, means to separate the lubricant from the compressed air of said mist, means to return the lubricant so separated to said sump, and means to return said compressed air so separated to said turbine.

6. An air compression and cooling system contained within a housing comprising a compressor having an inlet and a discharge side, a turbine having an inlet and a discharge side, a rotatable shaft joining and spacing said compressor and turbine such that said turbine and compressor are back-to-back on said shaft, duct means joining said compressor discharge side with said turbine inlet side, means to pass air through said compressor and turbine, at least one bearing supporting said shaft for rotation, an impeller having an inlet and an outlet mounted for rotation with said shaft, said housing supporting said bearing and having a lubricating cavity enveloping said bearing and impeller and defining a circuital path through said bearing and impeller, seals engaging said shaft one on each side of said bearing and impeller to seal between said shaft and housing lubricating cavity, a tank type oil sump located at the bottom of said housing, means to turbulently introduce lubricant to said impeller inlet from said sump as a function of impeller pressure drop so that said lubricant is hurled outwardly as a mist and is circulated through said cavity to lubricate and cool said bearing by impeller action, means to regulate said impeller pressure drop, separate turbine inlet air driven means to introduce lubricant to said impeller unit, means to pass compressor discharge air through each of said seals and into said lubricating cavity to retain said lubricant in said cavity and join said circulating mist, a lubricant-air separator located at the top of said housing, a first line joining said cavity to said sump and second and third lines connecting diagonally opposed top corners of said sump to said separator, a fourth line connecting said turbine inlet air driven means to said separator and a fifth line connecting said separator to said turbine discharge so that lubricant may be gravity drained to said sump from said lubricating cavity and so that lubricant mist may be passed by pressure differential from said cavity to said sump through said first line and from said sump to said separator through either said second or third line and so that turbine inlet air may be conducted from said separate drive means to said separator by pressure differential and further so that the lubricant separated from said mist in said separator may be gravity drained to said sump through either said second or third line and so that said air separated from said mist in said separator may be conducted to said turbine discharge through said fifth line by pressure differential, means to conduct air from said turbine discharge in heat exchanger relation to said cavity to cool said mist, and means to prevent heat flow from said compressor to said housing through said shaft.

References Cited in the file of this patent

UNITED STATES PATENTS

| | | |
|---|---|---|
| 2,492,672 | Wood | Dec. 27, 1949 |
| 2,646,210 | Kohlmann et al. | July 21, 1953 |
| 2,709,567 | Wood | May 31, 1955 |
| 2,775,400 | Cox | Dec. 25, 1956 |